United States Patent [19]
Lasser et al.

[11] Patent Number: 5,897,638
[45] Date of Patent: Apr. 27, 1999

[54] PARALLEL VIRTUAL FILE SYSTEM

[75] Inventors: Cliff Lasser, Cambridge; Robert Lordi, Wayland; Craig Stanfill, Waltham, all of Mass.

[73] Assignee: Ab Initio Software Corporation, Concord, Mass.

[21] Appl. No.: 08/876,734

[22] Filed: Jun. 16, 1997

[51] Int. Cl.$^6$ .................................................. G06F 17/30
[52] U.S. Cl. ............................... 707/102; 707/8; 707/10; 707/202; 707/203
[58] Field of Search ................................... 707/1, 2, 3, 6, 707/7, 8, 9, 10, 100, 101, 102, 103, 104, 200, 201, 205, 907, 513, 514, 500, 900, 902; 395/200.32, 200.49, 309, 726, 670, 672, 800.11

[56] References Cited

U.S. PATENT DOCUMENTS

| | | | |
|---|---|---|---|
| 5,202,971 | 4/1993 | Henson et al. | 707/8 |
| 5,446,915 | 8/1995 | Pierce | 395/800.11 |
| 5,603,019 | 2/1997 | Kish | 707/205 |
| 5,682,537 | 10/1997 | Davies et al. | 395/726 |
| 5,764,972 | 6/1998 | Crouse et al. | 707/1 |

OTHER PUBLICATIONS

Michael Harry et al., VIP–FS: A Virtual, Parallel File System for High Performance Parallel and Distributed Computing, IEEE 1995, and 159–164, Apr. 1995.
W.B. Ligon III et al., Implementation and Performance of a Parallel File System for High Performance Distributed Applications, IEEE 1996, and 471–480, Aug. 1996.
Horst F. Wedde et al., Distributed Management of Replicated and Partitioned files under dragon slayer, IEEE 1990, and 436–441, Nov. 1990.
Rajmohan Panadiwal et al., A High Performance and Reliable Distributed File Facility, IEEE 1994, and 116–123, Jun. 1994.

*Primary Examiner*—Wayne Amsbury
*Assistant Examiner*—Srirama Channavajjala
*Attorney, Agent, or Firm*—Fish & Richardson P.C.

[57] ABSTRACT

A parallel virtual file system for parallel processing systems including single-processor systems having multiple storage devices. The invention manages partitioned files as follows: (1) partitions of a partitioned file are stored in a set of isomorphic "data trees"; (2) an additional directory tree, called the "control tree", is used to build a model of the intended structure of the data trees; (3) the combination of a control tree and a collection of data trees is referred to as a "multifile system", with sets of files referred to as "multifile" and sets of directories referred to as "multi-directories;" data elements of a multifile or multidirectory are referred to as "data plies" and control elements of a multifile or multidirectory are referred to as "control plies"; (4) a set of multifile subroutines is provided for accessing and modifying the multifile system in such a way so as to preserve the isomorphic data structures for the partitioned data; (5) the multifile subroutines use a distributed computing environment which provides for remote procedure calls and, in one of the embodiments of the invention, for a distributed transaction processing protocol to ensure atomicity of structural changes to the multifile system; (6) interference of concurrent file system operations is prevented by creating a "transactional" lock for each file system.

20 Claims, 7 Drawing Sheets

PARALLEL VIRTUAL FILE SYSTEM

BACKGROUND

1. Field of the Invention

This invention relates to computer processing systems, and more particularly to a parallel virtual file system for parallel processing systems including single-processor systems having multiple storage devices.

2. Description of Related Art

Computational speeds of single processor computers have advanced tremendously over the past three decades. However, many fields require computational capacity that exceeds even the fastest single processor computer. An example is in transactional processing, where multiple users access computer resources concurrently, and where response times must be low for the system to be commercially acceptable. Another example is in database mining, where hundreds of gigabytes of information must be processed, and where processing data on a serial computer might take days or weeks. Accordingly, a variety of "parallel processing" systems have been developed to handle such problems. For purposes of this discussion, parallel processing systems include any configuration of computer systems using multiple central processing units (CPUs), either local (e.g., multiprocessor systems such as SMP computers), or locally distributed (e.g., multiple processors coupled as clusters or MPPs), or remotely, or remotely distributed (e.g., multiple processors coupled via LAN or WAN networks), or any combination thereof. Further, in the context of this invention, parallel processing systems includes single-processor systems having multiple storage devices.

It is common practice to achieve high performance on parallel processing systems by the following means:

- The data sets which the computer is to access are divided ("partitioned") into several disjoint sets of records and stored on a collection of storage devices. A data set which has been divided in this fashion is called a "partitioned file", and each subdivision is called a "partition."
- Several instances of the programs comprising an application and which process the data are run on a collection of processors, or as independent tasks on one processor.
- Each program-instance accesses one partition of each partitioned file being processed.

The benefits of this practice are that simultaneous use of multiple storage devices enables high aggregate data transfer rates, and simultaneous use of multiple processors enables high aggregate processing rates.

The developer of such applications is then faced with the problem of managing and using partitioned files. Among the problems which must be faced are the following:

- Each partitioned file must be created and, eventually, deleted.
- Each partitioned file must be accessed by applications.
- Partitioned files must be organized, e.g., into file systems.
- Partitioned files must be administered, e.g., repaired when damaged.

One solution to these problems in the prior art is to arrange for some ad hoc variant on the following scheme:

- Each processor in the system has its own set of storage devices.
- Each storage device is set up with an "isomorphic" file system, i.e., a file system having the same arrangements of files and directories, with only the contents of the files differing from system to system.
- When an application wishes to effect some change in the partitioned files (e.g., create a file), the application invokes an instance of a program on every processor in the system, with each program instance being given the same parameters (e.g., file name).
- It is necessary that each instance of the program behave identically from the view point of structural alterations to the file system. For example, if one program instance creates a file, then all program instances must create the same file (i.e., a file having the same name, but within a different file system).

As long as these principles are adhered to, the file systems should remain isomorphic.

This prior art approach has several useful properties:

Programs which access the data in the partitions may do so using standard file-system interfaces.

The fact that all the file systems have isomorphic structures makes them no harder to administer than a single file system. This is because file system administration is primarily a matter of establishing, monitoring, and altering the structure of directories and files in a system. Since the structure of a collection of isomorphic file systems is no more complex than that of a single file system, administrating a collection of isomorphic file systems is generally no more complex than administering a single file system.

However, there are several difficulties with this approach:

Every application wishing to use such a strategy must include a "hand-crafted" implementation of this approach.

If any user or application departs from the conventions noted above, then the various file systems may gradually acquire different structures. Once isomorphism has been lost, managing the system becomes much more complex, since now the administrator must understand and manage the different structures which have appeared in the various constituent file systems.

If the system crashes at an inadvertent time, it is possible that certain structural changes will have been made to some of the file systems, but not to others. In order to restore isomorphism, an administrator will have to inspect each file system, looking for inconsistencies, and repair them according to the administrator's best understanding of the intended file system structure. Furthermore, if isomorphism has not been rigidly enforced, the administrator will have no way of knowing which departures from isomorphism are intentional, and which are an artifact of a system failure.

If two applications simultaneously access the "isomorphic" file systems, they may interfere with each other. For example, if application program A renames a file and application program B tries to delete the same file, it is possible that, on some processors application program A will run first (the file will be renamed), but that on other processors application program B will run first (the file will be deleted). This will result in a loss of isomorphism, leading to great administrative difficulties (the two applications should probably not have been run simultaneously, but such errors are common; the loss of isomorphism is an unacceptable result for such a common error).

Thus, there is a need for a better method of managing partitioned files in parallel processing systems. The present invention provides such a method.

SUMMARY

The invention is a parallel virtual file system for managing partitioned files, the broad outlines of which are as follows:

Partitions of a partitioned file are stored in a set of isomorphic "data trees".

An additional directory tree, called the "control tree", is used to build a model of the intended structure of the data trees. The control tree allows the computer system to "locate" (generate a path name for) data within the data trees.

The combination of a control tree and a collection of data trees is referred to as a "multifile system". Files in the multifile system are referred to as "multifiles." Directories in the multifile system are referred to as "multidirectories." Data elements of a multifile or multidirectory are referred to as "data plies." Control elements of a multifile or multidirectory are referred to as "control plies."

A set of multifile subroutines is provided for accessing and modifying the multifile system, e.g., making structural changes to the data trees or obtaining identifiers for data plies of a multifile or multidirectory. Where practical, the multifile subroutines have an interface mimicking that of the native file system.

The multifile subroutines use a distributed computing environment which provides for remote procedure calls (RPCs) and, in one of the embodiments of the invention, for a distributed transaction processing protocol (e.g., two-phase commit) to ensure atomicity of structural changes to the multifile system. The distributed computing environment must also provide for "distributed file operations" (fileops).

Interference of concurrent file system operations is prevented by creating a "transactional" lock for each file system.

The invention includes an automatic system for preserving isomorphism through use of transactional locks and the control tree in conjunction with multifile file system operations. Data and file recovery are provided by use of the distributed transaction processing protocol.

The intended use of multifiles is as a component of a system which operates by running multiple instances of a program on multiple processors (or multiple tasks on one processor), with each program-instance operating on a different data file of the multifile. The general pattern of usage is as follows:

A central "driver program" uses the subroutine interface of the invention to effect structural changes in the multifile system.

The driver program may launch multiple program instances on various processors. Typically, there will be one program instance for each data tree in the multifile system, and each program instance typically operates on the contents of one distinct data tree.

The above steps may be repeated multiple times within any application.

The invention may be applied in several ways:

As part of an application. In this case, the multifile subroutines are included as part of the application driver. The application driver and the multifile subroutines share access to a single distributed computing system, which will invoke distributed programs on the behalf of the driver, and invoke fileops and RPCs on behalf of the multifile software.

As a distributed service. In this case, the owner of the computers containing the control and data trees would need to ensure that a "multifile server" was running at all times. The subroutines explained below would then be embedded as part of the server, which would also incorporate a distributed computing environment. Applications wishing to use these services would contain "stub subroutines" which would contact the appropriate servers to perform multifile operations. Preferably, these stub subroutines would mimic the interface of the native file system interface, in order to minimize the work needed to adopt the multifile system. Communications between the driver and the program instances might then be governed by a second distributed computing environment or, alternatively, by the same distributed computing environment as is used by the multifile server.

As a part of an operating system. Typically, the operating system's file system interface may be extended to recognize multifile commands and dispatch them to a multifile server via a "file system driver" interface. Many operating systems (e.g., Microsoft Corporation's NT operating system) provide interfaces which facilitate this sort of integration. Once the multifile server has been engaged, the implementation is much like the case of a distributed service.

The details of the preferred embodiment of the invention are set forth in the accompanying drawings and the description below. Once the details of the invention are known, numerous additional innovations and changes will become obvious to one skilled in the art.

BRIEF DESCRIPTION OF THE DRAWINGS

Like reference numbers and designations in the various drawings indicate like elements.

DETAILED DESCRIPTION OF THE INVENTION

Throughout this description, the preferred embodiment and examples shown should be considered as exemplars, rather than as limitations on the invention.

Overview

Figure 1:
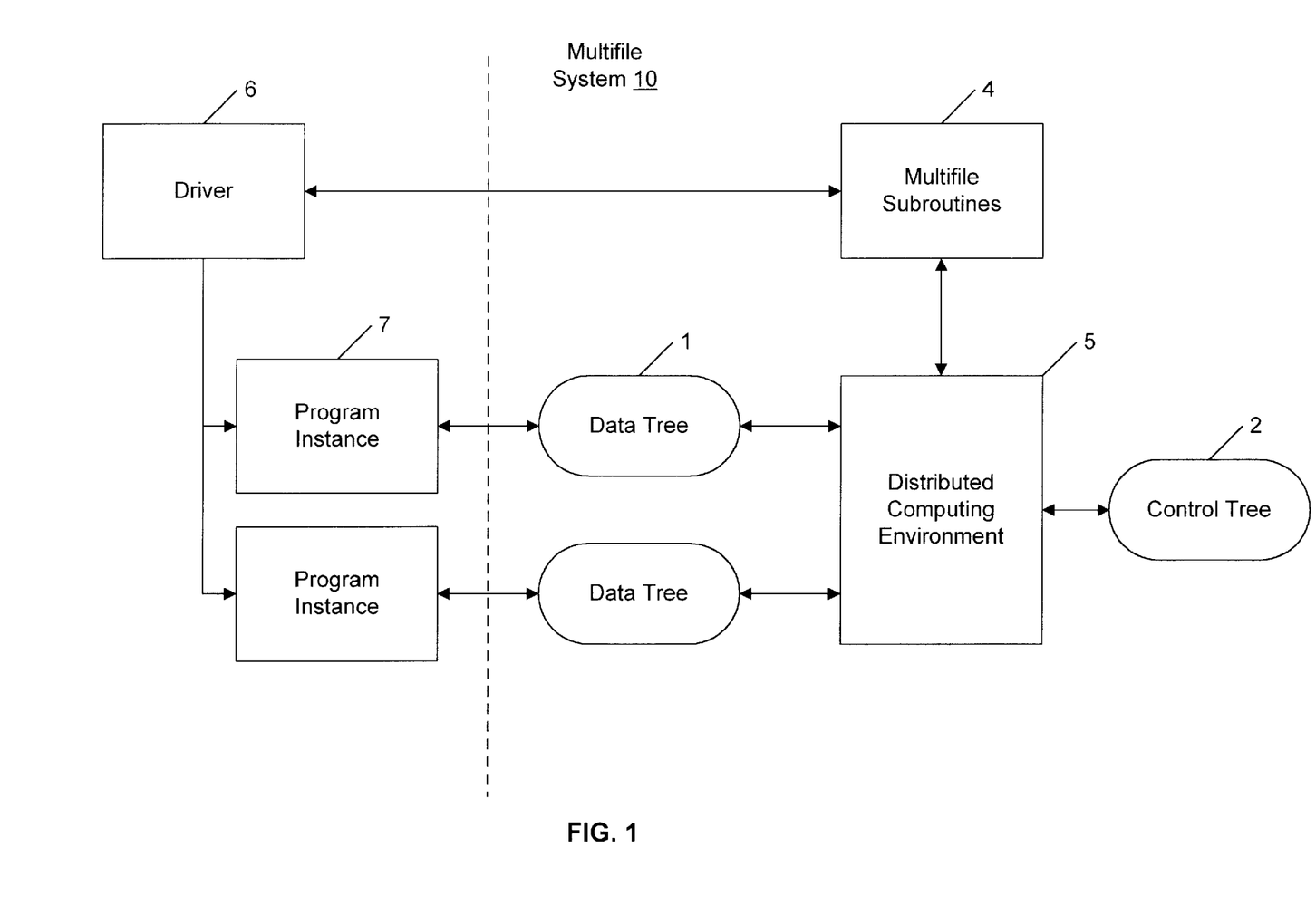
FIG. 1 is a block diagram showing the relationship of components comprising the invention.

The invention comprises a parallel virtual file system for managing partitioned files. FIG. 1 is a block diagram showing the relationship of components comprising the invention. The broad outlines of the preferred embodiment of the invention are as follows:

Partitions of a partitioned file are stored in a set of isomorphic "data trees" 1 (this is a modest generalization of the principle of using isomorphic file systems).

An additional directory tree, called the "control tree" 2, is used to build a model of the intended structure of the data trees 1. The control tree 2 allows the computer system to "locate" (generate a path name for) data within the data trees 1.

The combination of a control tree 2 and a collection of data trees 1 is referred to as a "multifile system" 10. Files in the multifile system 10 are referred to as "multifiles." Directories in the multifile system 10 are referred to as "multi-directories." Data elements of a multifile or multidirectory are referred to as "data plies." Control elements of a multifile or multidirectory are referred to as "control plies."

A set of multifile subroutines 4 is provided for accessing and modifying the multifile system, e.g., making structural changes to the data trees 1 or obtaining identifiers for data plies of a multifile or multidirectory. Where practical, the multifile subroutines 4 have an interface mimicking that of a native file system.

The multifile subroutines 4 use a distributed computing environment 5 which provides for remote procedure calls (RPCs) and, in one of the embodiments of the invention, for a distributed transaction processing protocol (e.g., two-phase commit) to ensure atomicity of structural changes to the multifile system. The distributed computing environment 5 must also provide for "distributed file operations" (fileops) 8 (see, e.g., FIG. 5) that implement multifile RPCs.

Interference of concurrent file system operations is prevented by creating a "transactional" lock for each file system.

The intended use of multifiles is as a component of a parallel processing system which operates by running multiple instances of a program on multiple processors (or multiple tasks on one processor), with each program-instance operating on a different data file of the multifile. The general pattern of usage is as follows:

A central "driver program" 6 uses the subroutine interface of the invention to effect structural changes in the multifile system 10.

The driver program may launch multiple program instances 7 on various processors. Typically, there will be one program instance 7 for each data tree 1 in the multifile system 10, and each program instance 7 typically operates on the contents of one distinct data tree 1.

The above steps may be repeated multiple times within any application.

Data Structures

Figure 2:
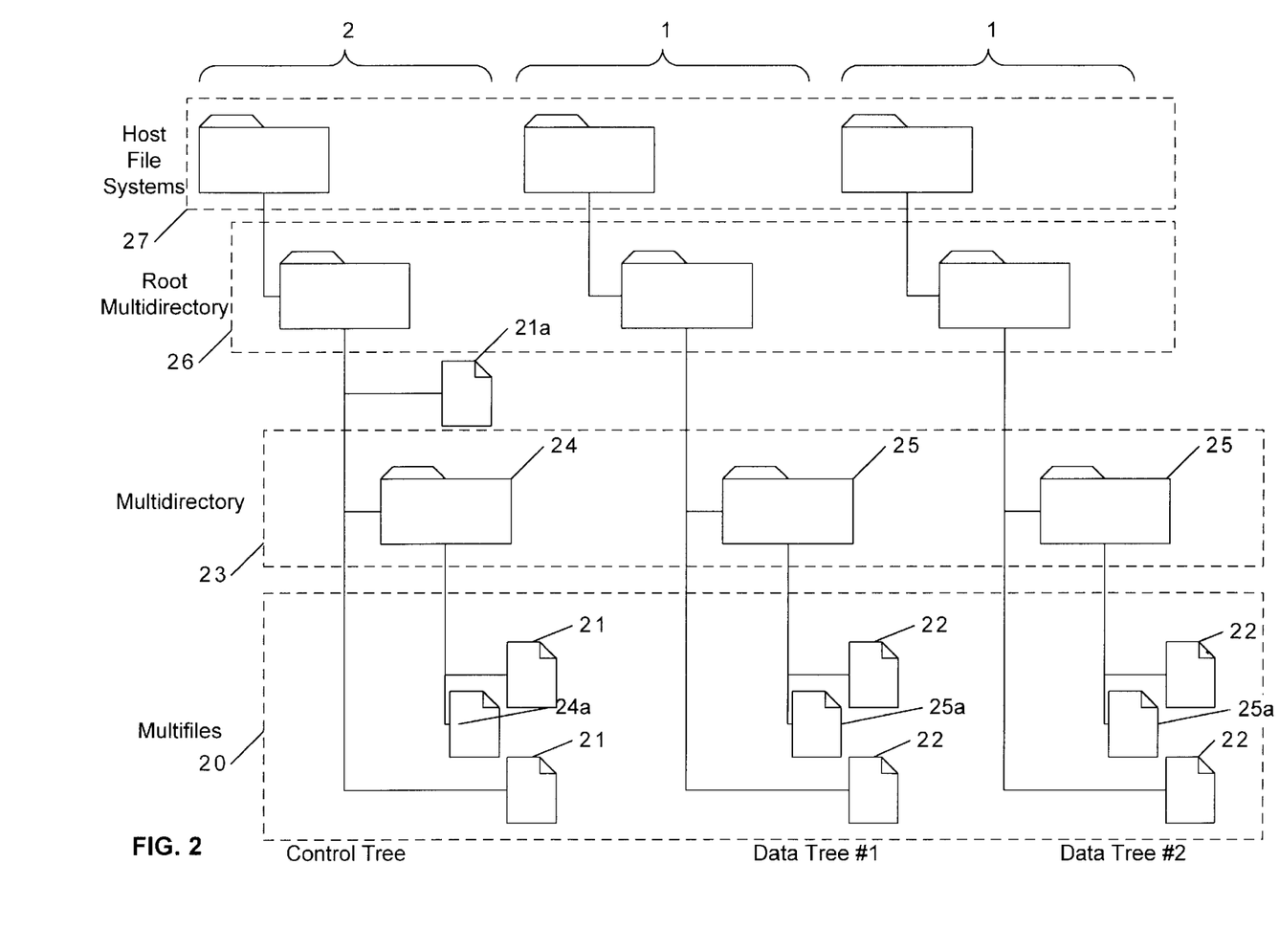
FIG. 2 is a block diagram showing the data structure of the invention.

FIG. 2 is a block diagram showing the data structure of the invention. The multifile system in the preferred embodiment of the invention comprises a set of isomorphic directory and file trees, one of which is designated the control tree 2, with the remainder being designated data trees 1. "Isomorphic" means that there is a one-to-one correspondence between files and directories in the various trees, such that the relationships between directories, sub-directories, and files is the same in all such trees, except as specifically noted. Additionally, the corresponding elements of each such tree have the same names. However, the contents of the data files will not, in general, be the same.

The term "depth" refers to the number of data trees 1. A multifile 20 comprises a file in the control tree 2 (a "control file" 21) plus the corresponding file in each data tree ("data files" 22). A multidirectory 23 comprises a directory in the control tree (the "control directory" 24) plus the corresponding directory in each data tree ("data directories" 25). Further control directories 24a may be created underneath a control directory 24, and further data directories 25a may be created underneath each data directory 25, as shown. The collection of top-most multidirectories 23 in the various trees 1, 2 are referred to as the "root multidirectory" 26 or simply as the "root." A set of host file systems 27 provide data storage for the data trees 1 and control trees 2.

A data file 22 of a multifile 20 or a data directory 25 of a multidirectory 23 may be referred to as a "data ply". The control file 21 of a multifile 20 or the control directory 24 of a multidirectory 23 may be referred to as a "control ply." The control and data plies are referred to collectively as "plies."

In the preferred embodiment, every ply of every multifile/multidirectory is identified by a "Uniform Resource Locator" (URL) which is a text string having the following form in the preferred embodiment:

file://hostname/filename where the 'file' designator is to be taken literally, the 'host name' designator is a valid Internet host name, and the 'filename' designator is a valid file name on the host's native file system. The use of URLs to identify objects in a distributed/networked environment is common practice. The interpretation is that the URL refers to a file called "filename" which is accessible on the host called "hostname."

A multifile 20 or multidirectory 23 is identified by the URL of its control ply, except that the "file" designator in the URL is replaced by an "mfile" designator. The control tree 2 stores information needed to locate the data plies of the various multifiles/multidirectories. This information takes the form of control files 21 which contains the root control ply's URL. The only exception is the root multidirectory control file 21a, which additionally contains URLs for the root data plies. The multidirectory control file 21a is the single departure from isomorphism between the control tree 2 and the data trees 1 in a multifile systems. By convention, if "dir" is the control ply of a multidirectory 23, then "dir/.mdir" is the control file 21 for that multidirectory 23.

Figure 3:
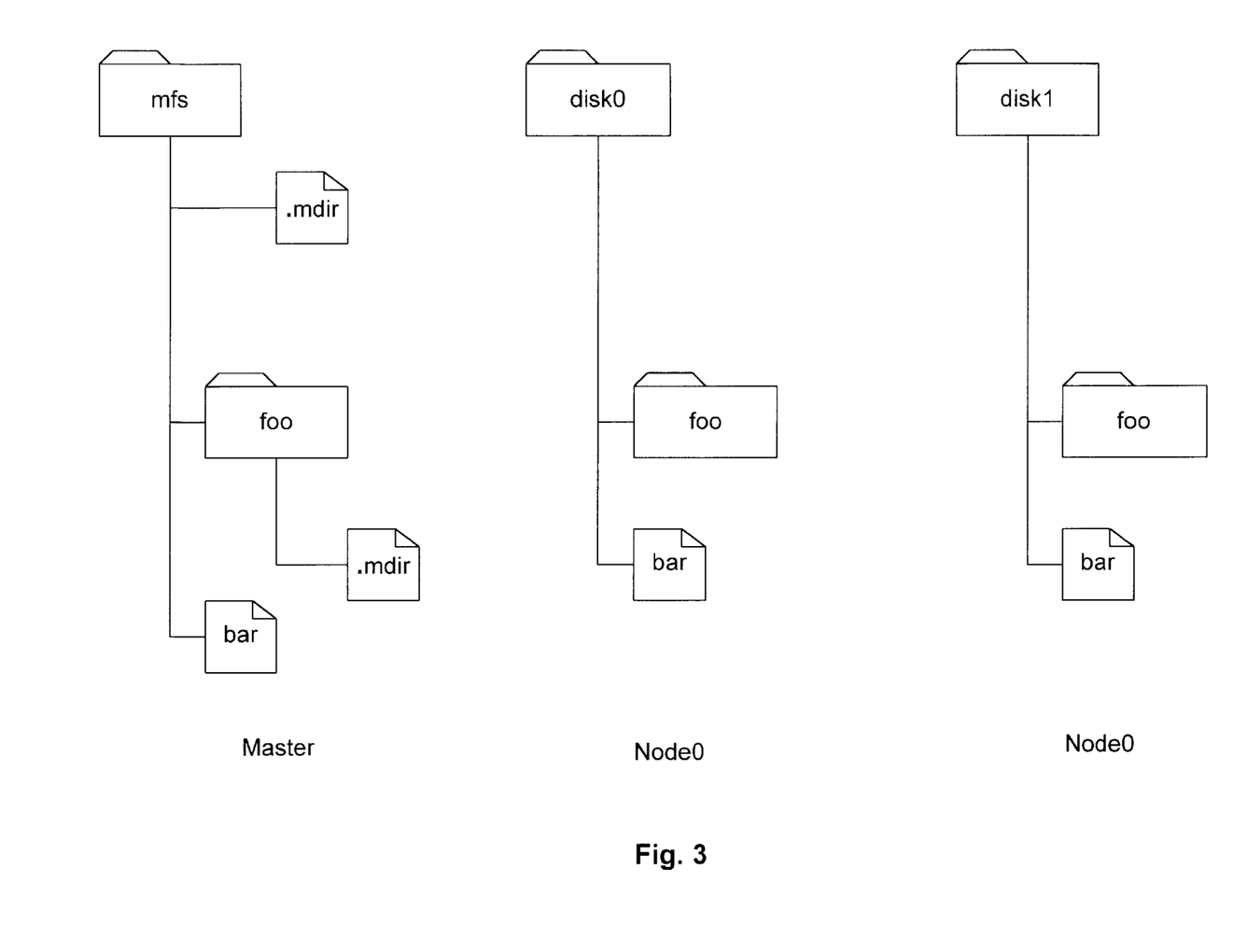
FIG. 3 is a block diagram showing an example of using the data structures of the preferred embodiment of the invention.

FIG. 3 is a block diagram showing an example of using the data structures of the preferred embodiment of the invention. Three computer systems are shown, "master", "node0", and "node1". A multifile system with a depth of two can be created on those systems by specifying directories on each. For example, the root control directory could be '/mfs' and the data directories could be '/disk0' and '/disk1'. A multidirectory "foo" and a multifile "bar" can then be created, as shown. The various elements of this multifile system are as follows:

A. The root of the multifile system:
1. URL=mfile://master/mfs
2. control ply=file://master/mfs
3. data plies=file://node0/disk0, file://node1/disk1
4. control file=file://master/mfs/.mdir
5. control file contents=file://master/mfs, file://node0/disk0, file://node1/disk1

B. The multidirectory "foo":
1. URL=mfile://master/mfs/foo
2. control ply=file://master/mfs/foo
3. data plies=file://node0/disk0/foo, file://node1/disk1/foo
4. control file=file://master/mfs/foo/.mdir
5. control file contents=file://master/mfs C. The multifile "bar":
1. URL=mfile://master/mfs/bar
2. control ply=file://master/mfs/bar
3. data plies=file://node0/disk0/bar, file://node1/disk1/bar 4. control file=file://master/mfs/bar
5. control file contents=file://master/mfs The data structures for multifiles 20 and multidirectories 23 shown above can be manipulated, accessed, and managed using the algorithms set forth below.

Ensuring Integrity of a Multifile System

There are several threats to the integrity of a multifile system. First, if multiple users simultaneously attempt to make changes to the structure of the multifile system, the two requests must not interfere in a way that damages the multifile system. Second, failures (e.g., system crashes) must not damage the multifile system.

The first problem may be solved by employing a "two phase locking" protocol such as is well-known in the art. In the preferred embodiment, each file system operation is required to apply a transactional "lock" to certain resources (e.g., files, directories, etc.) in order to guard against the possibility that two file system operations, running concurrently, might interfere with each other. Each lock may be obtained in either a "shared mode" or an "exclusive mode". Multiple file operations may concurrently hold shared mode locks on a particular resource. An exclusive mode lock on a particular resource may only be obtained if no other file system operation owns a lock (shared or exclusive) on that resource. The simplest scheme is to acquire an exclusive lock on the root of the control tree any time the file system is to be modified (for example, by deleting a file or renaming a directory), and to acquire a shared lock while accessing (e.g., reading) information in the control tree. Locks are released at the end of the file system operation (e.g., at commit time when using the well-known two-phase locking protocol). This technique prevents loss of isomorphism in the presence of concurrent multifile file system operations. This technique will, however, limit the number of concurrent file system operations that can modify the file system. This may be remedied by reducing the granularity of locks. For example, each control directory may have a lock associated with it. Any operation on a file or directory which is in a control directory must first acquire the associated lock in shared or exclusive mode, as appropriate.

The second problem (failure recovery) requires assurance that after a failure, the system can either undo an operation or force it to completion. This may be accomplished under the invention by either of two different failure recovery (FR) mechanisms:

FR1: Perform all operations under the control of a distributed transaction processing environment. If a system failure occurs, the transaction processing environment ensures that partial changes to the various file systems may be "rolled back."

FR2: At/near the start of each operation, record auxiliary information such that, if a system failure occurs, a "file system recovery" program may either undo partial changes effected by the interrupted operation or force the operation to completion.

The first method for file recovery requires the use of a distributed transaction processing environment which must provide certain services:

Start transaction, commit, rollback. These terms have their usual meanings known in the art. The start-transaction command notifies the distributed computing environment that all subsequent distributed operations will be grouped into a transaction, such that the effects of all such operations will eventually either be made permanent or be rolled back. The commit-transaction operation causes the effects of the distributed operations in the transaction to be made permanent. The rollback operation causes the effects of the distributed operations in the transaction to be undone. In the event of a failure, rollbacks will be automatically initiated for any operations which had not been committed. In the case of operations which do not modify any persistent data stores (e.g., "get status information"), the start-transaction and commit-transaction operations may be omitted.

Remote Procedure Calls (RPCs). An RPC command causes a subroutine, specified by a "command identifier string", to be invoked on some remote system, specified by a "host name." The issuer of the RPC command may provide parameters to be passed to the specified subroutine; the subroutine may return a value which will be returned to the issuer of the RPC. If the RPC modifies any permanent data structures (e.g., the contents of a data storage system), then the RPC must participate in the transaction protocol defined by the distributed computing environment, such that if the transaction is rolled back, the effects of the RPC will be undone, and if the transaction is committed, the effects of the RPC will be made permanent.

Distributed transactional file operations ('fileops'). Fileops are subroutines, callable via RPCs, which make structural changes to the native file system, such that they may participate in the distributed transaction processing scheme being used. These "fileops" must participate in the distributed transaction processing protocol.

Prior art describes a "two-phase commit" protocol which is commonly used to implement the distributed transaction features. There are commercially available programs ("transaction monitors" such as ENCINA, produced by Transarc) which implement the combination of distributed transactions and RPCs required above. Transactional fileops are not a part of the prior art, but are described in the co-pending U.S. patent application entitled "Restoring the State of a Set of Files," Ser. No. 08/678,398, filed Jul. 2, 1996, assigned to the assignee of the present invention, the disclosure of which is hereby incorporated by reference.

By using the distributed transaction processing environment in conjunction with transactional fileops, structural changes can be made to storage systems on multiple systems, such that either 1) all such changes are made permanent, or 2) all such changes are rolled back. This combination of techniques ensures that the control trees 2 and data trees 1 of the multifile system remain isomorphic.

If a system failure occurs, the distributed transaction system is used to roll back any uncommitted changes. If locking is used, the roll back must be completed before the locks are released.

The second method for file recovery requires only the use of a distributed computing environment that supports the following capabilities:

Remote Procedure Calls (RPCs). This is as before, except that there is no need to coordinate with a transaction processing protocol.

Distributed transactional file operations ('fileops'). Again, RPCs are used to effect changes to files, except that there is no need to coordinate with a transaction processing protocol.

These requirements can be met by a variety of distributed computing environments, such as the Open Software Foundation's "Distributed Computing Environment" (DCE) standard.

A step is then inserted into each multifile system algorithm to save "auxiliary information" to non-volatile memory (e.g., a file in the root control directory). If an operation does not modify any persistent data stores, then the "store auxiliary information" step may be omitted. If a system failure occurs, a "recover multifile system" utility must be run before additional multifile operations can be performed. This utility reads the auxiliary information, determines the operation which was in progress, and calls an appropriate recovery routine (one such routine is provided for each operation which modifies the state of the file system).

General Form for Multifile Operations

Combining the two methods above, the general form of the algorithms for manipulating, accessing, and managing multifiles is as follows:

1) (FR1 only) Start a transaction.
2) Lock the multifile system using at least a shared lock on the root of the control tree 2. In some instances, an exclusive lock may be required on certain resources.
3) Use an RPC to read information from the control tree 2.
4) Determine whether the user has permission to perform the requested operation.
5) (FR2 only) Record auxiliary information.
6) Use one or more RPCs to effect changes in the control tree 2 and data trees 1.
7) (FR1 only) If all steps of the operation succeeded, commit the transaction; otherwise roll it back.
8) (FR2 only) If all steps in the operation succeeded, erase the auxiliary information.
9) Release the lock.

Specific actions would be taken at recovery time if FR2 is used.

Using the multifile/multidirectory data structures, the following preferred algorithms can be used to process partitioned files in such a way as to avoid the problems of the prior art, including maintaining complete isomorphism.

(1) Subroutine to get Control Information

Figure 4:
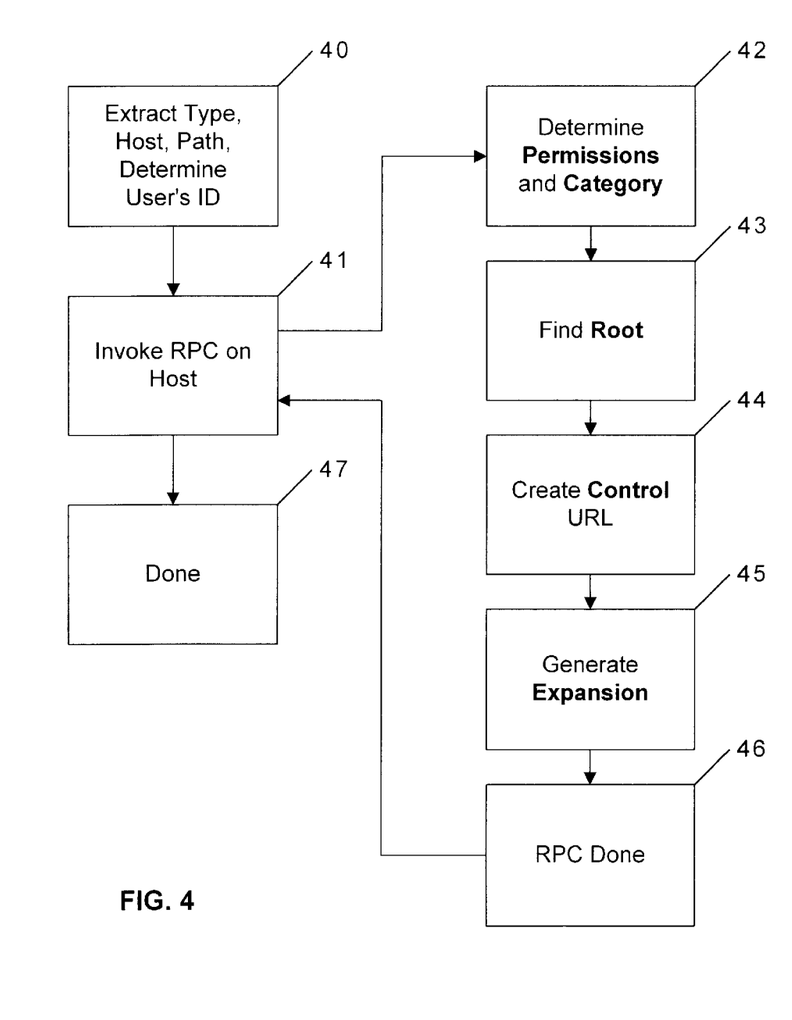
FIG. 4 is a flowchart showing the basic subroutine used by most of the preferred algorithms to access the control free of a multifile system and extract certain control information which is generally required by other basic algorithmic subroutines in the preferred embodiment of the invention.

FIG. 4 is a flowchart showing the basic subroutine used by most of the preferred algorithms to access the control tree 2 of a multifile system 10 and extract certain Control Information which is generally required by other basic algorithmic subroutines. This routine is internal to the system, and obtains the following information, given a URL and a user identifier:

A. An indication as to what permissions the specified user has with regard to that file: permission to create, permission to delete, permission to read, permission to write, and/or permission to probe (where "probe" permission includes permission to know whether the file exists and permission to discover its plies).
B. An indication as to whether 1) the URL refers to a multifile; 2) the URL refers to a multidirectory; or 3) any such file exists.
C. The URL for the root of the multifile system.
D. The URL for the control ply (this is the "target" with its type changed from file to mfile, as noted above).
E. An array of URLs for the data plies.

Parameters:

A. target—the URL of the multifile/multidirectory of interest. The type of "target" must be "mfile".
B. user—the identifier for the current user of the system.

Return Values:

A. permissions—indicate the user's permissions with regard to the URL, specifically whether the user has probe, read, write, create, and/or delete permission. Initially, "unknown".
B. category—indicates whether the URL refers to a multifile, a multidirectory, or nothing (i.e., it does not exist). Initially, "unknown".
C. root—indicates the root of the multifile system. Initially, "unknown."
D. control—the URL for the control ply.
E. expansion—indicates the URLs of the data elements. Initially, "unknown."

Algorithm:

A. Extract the host-name host and pathname path from target (STEP 40).
B. Invoke an RPC on host which performs the remaining steps of this algorithm (STEP 41).
C. Use the native file system interface to determine path's category and user's permissions (STEP 42). For example, under the UNIX operating system, this may be done as follows:
  1. If user does not have permission to probe the file, then set permissions to "none" and exit.
  2. Otherwise, set permissions to "probe" and continue.
  3. Extract the "parent" directory of path; store it in parent. This may be done by stripping off the last component of path. For example, the parent directory of "/mfs/foo" is "/mfs".
  4. If neither path nor parent exists, set category to "none" and exit (note that neither create nor delete permission is considered granted in this case).
  5. If path does not exist, set category to "none."
  6. If path refers to a directory, set category to "multidirectory."
  7. If path refers to a file, set category to "multifile."
  8. If path exists and user has permission to read from path, add "read" to permissions.
  9. If path exists and user has permission to write to path, add "write" to permissions.
  10. If parent exists and user has permission to write to parent, add "create" and "destroy" to permissions.
D. Consult the information in the control tree 2 to find the URL for the root of the multifile system (STEP 43). The exact method depends on the category of "file":
  1. If category is "file", extract root from the multifile control file path.
  2. If category is "none", extract root from the parent directory's control file parent/.mdir
  3. The remaining case is that category is "directory", in which case extract root from the multidirectory control file path/.mdir.
E. Generate control by changing the type of target from 'mfile' to 'file' (STEP 44).
F. Generate expansion as follows (STEP 45):
  1. Read the URLs for the root data plies from the root control file (root/.mdir). Call this list root_expansion.
  2. Strip root from the front of control, yielding a relative_path giving the pathname from root to control. For example, if root is "file://master/mfs", and control is "file://master/mfs/bar", then relative_path will be "bar".
  3. Construct the expansion by looping through root_expansion, adding relative_path to each such URL. For example, if we have:
  control=file://master/mfs/bar root=file://master/mfs
relative_Path=bar
root_expansion=file://node0/disk0, file://node1/disk1
then the resulting expansion will be:
file://node0/diskO/bar, file://node1/disk1/bar G. Return (RPC done) (STEP 46), subroutine done (STEP 47).

(2) Variant Control File Formats

It is possible to implement the invention with variant control formats. For example, one might pre-compute expansion and store it in a control file. If this is done, then additional code will be required to update the contents of the control file whenever the control file's name changes (e.g., after a 'rename' operation). A second option is to omit the root URL from the control file, leaving control files empty. If this is done, then the root will have to be located by searching each parent directory of target, looking for the root multi-directory control file 21a.

(3) Locking/Unlocking the Multifile System

Many of the file system operations require that the file system be "locked" or "unlocked" so as to prevent simultaneous operations from interfering with each other. Prior art provides a wide variety of methods for accomplishing this. The following method is one way of accomplishing the operation:

A. Locate the multifile system root control file 21a (e.g., by reading the control file of the multifile/ multidirectory being operated on).

B. Lock that file using the "lock file" operation provided by most operating systems (e.g., UNIX).

C. Unlock that file at the end of the operation.

(4) Expand

User-written applications must often discover the URLs for the data plies of a multifile/multidirectory. An expand subroutine provides this capability. The usual practice will be for the application driver to use the following expand subroutine, then create one program instance for each element of the expansion.

Arguments:

A. target—the URL of the multifile/multidirectory to be expanded.

Algorithm:

A. Lock the multifile system, preferably using a shared lock on the multifile system and on the control ply of the target.

B. Get the Control Information for target.

C. Abort if:
1. The user does not have "probe" permission
2. expansion is "unknown" (this will happen if neither target nor its parent directory exists).

D. Release the lock.

E. Return expansion.

(5) Create a Multifile System

This routine allows an administrator/user to create a new multifile system. The steps in this algorithm are slightly different from the "normal" case noted above; specifically, the "get control information" subroutine cannot be used because the control tree does not exist yet, and the multifile system cannot be locked, again because it does not yet exist. (It is theoretically possible but unlikely that two individuals would attempt to create a multifile system at the same time, in the same place, with unfortunate results. The system administrator should take steps to ensure that this does not happen by controlling access to this routine.)

Arguments:

A. control—a URL for the root control directory of the multifile system.

B. data—a list of URLs for the root data directories of the multifile system.

C. mode—a "protection mode" which specifies access permissions which are to be granted for the root directory of the multifile system; the protection modes are specified in accordance with the base file system (e.g., UNIX).

Algorithm:

A. (FR1 only) Start a transaction.

B. Use a series of RPCs to determine whether the user can create the directories specified by control and data. If not (e.g., a directory having that name already exists), abort the operation.

C. (FR2 only) Record the following auxiliary information:
1. control.
2. data.

D. Perform the operation:
1. Use a fileop to create the directory control with the access permissions specified by mode.
2. Use a fileop to create the control file "control/.mdir", containing the URLs for the data directories.
3. Use a series of fileops to create each of the directories in data. Again, use the protection modes specified by mode.

E. (FR1 only) If all steps of the operation succeeded, commit the transaction; otherwise roll it back.

F. (FR2 only) If all steps in the operation succeeded, erase the auxiliary information.

Recovery (FR2 only)

A. Delete control/.mdir, if it exists.

B. Delete control, if it exists.

C. Delete all directories in data, if they exist.

D. Read the recorded auxiliary information and restart the operation at step D (above).

(6) Remove a Multifile System

This function removes a multifile system. It requires that the multifile system be empty in the preferred embodiment.

Arguments:

A. target—the URL of the root of a multifile system.

Algorithm:

A. (FR1 only) Start a transaction.

B. Lock the multifile system preferably using an exclusive lock on the root of the control tree 2.

C. Get the Control Information for target.

D. Abort the operation if:
1. user does not have delete permission.
2. target is not a directory.
3. target is not the root of the multifile system.
4. target contains anything other than its control file (.mdir)

E. (FR2 only) Record auxiliary information:
1. target 2. control
 3. expansion
F. Perform the operation:
 1. Use a series of fileops to remove the directories in expansion.
 2. Use a fileop to remove the file control/.mdir
 3. Use a fileop to remove the directory control.
G. (FR1 only) If all steps of the operation succeeded, commit the transaction; otherwise roll it back.
H. (FR2 only) If all steps in the operation succeeded, erase the auxiliary information.
I. Release the lock.
Recovery (FR2 only):
A. Read the recorded auxiliary information and restart the operation at step F (above).

(7) Create a Multidirectory

This routine creates a multidirectory specified by a URL.
Arguments:
A. target—the URL of the directory/multidirectory to be created.
B. mode—specifies the access permissions which are to be granted for the newly created directory.
Algorithm:
A. (FR1 only) Start a transaction.
B. Lock the multifile system preferably using a shared lock on the root of the control tree 2 and an exclusive lock on the control directory 24 where the control ply 24a is to be created.
C. Obtain the Control Information for target.
D. Abort if any of the following are true:
 1. Category is anything other than "nothing." (i.e., user has asked to overwrite an existing multifile or multidirectory).
 2. User does not have "create" permission (this could happen because the parent directory of target does not exist).
E. (FR2 only) Record auxiliary information:
 1. target
 2. mode
 3. control
 4. expansion
F. Perform the operation:
 1. Use a series of fileops to create each of the directories specified in expansion, each having the access permissions specified by mode.
 2. Use a fileop to create the control directory specified by control.
 3. Use a fileop to create the multidirectory control file "control/.mdir", containing root.
G. (FR1 only) If all steps of the operation succeeded, commit the transaction; otherwise roll it back.
H. (FR2 only) If all steps in the operation succeeded, erase the auxiliary information.
I. Release the lock.
(FR2 only) Recovery:
A. Delete control/.mdir
B. Delete control
C. Delete all elements of expansion.
D. Read the recorded auxiliary information and restart the operation at step F (above).

(8) Remove a Multidirectory

This routine deletes a multidirectory specified by a URL. It must be empty in the preferred embodiment.

Arguments:
A. target—the URL of the directory/multidirectory to be deleted.
Algorithm
A. (FR1 only) Start a transaction.
B. Lock the multifile system preferably using a shared lock on the root of the control tree 2 and an exclusive lock on the control directory 24 where the control ply 24a is located.
C. Get the Control Information for target.
D. Abort the operation if any of the following are true:
 1. User does not have permission to delete the directory target.
 2. Target is not a directory.
 3. The control directory contains anything other than .mdir (use an RPC to read the contents of control).
E. (FR2 only) Record auxiliary information:
 1. target
 2. control
 3. expansion
F. Perform the operation:
 1. Use a fileop to delete the multidirectory control file (control/.MDIR).
 2. Use a fileop to delete the control directory (control).
 3. Loop over all URLs in expansion, deleting them via fileops.
G. (FR1 only) If all steps of the operation succeeded, commit the transaction; otherwise roll it back.
H. (FR2 only) If all steps in the operation succeeded, erase the auxiliary information.
I. Release the lock.
(FR2 only) Recovery:
A. Read the recorded auxiliary information and restart execution at step F (above).

(9) Create a Multifile

Creates a multifile specified by a URL. The specified multifile must not already exist.
Arguments:
A. target—the URL of the file/multifile to be created.
B. mode—specifies the access permissions which are to be granted for the newly created file.
Algorithm
A. (FR1 only) Start a transaction.
B. Lock the multifile system preferably using a shared lock on the root of the control tree 2 and an exclusive lock on the control directory 24 where the control file 21 is to be created.
C. Obtain the Control Information for target.
D. Abort if any of the following are true:
 1. The file exists.
 2. User does not have permission to create the file (this could happen because the parent directory of target does not exist).
E. Record auxiliary information:
 1. target
 2. mode
 3. control
 4. expansion
F. Perform the operation:
 1. Use a fileop to create the control file specified by control, containing root.
 2. Use a series of fileops to create each of the files specified by expansion, having the access permissions specified by mode. The data files will be empty.

G. (FR1 only) If all steps of the operation succeeded, commit the transaction; otherwise roll it back.

H. (FR2 only) If all steps in the operation succeeded, erase the auxiliary information.

I. Release the lock.

(FR2 only) Recovery:

A. Delete control.

B. Delete all files in expansion.

C. Read the recorded auxiliary information and restart the operation at step F (above).

(10) Create a link to a multifile

This routine creates a link to a multifile (applicable only to file systems such as UNIX which allow for multiple links to a file). The link is created for all plies (control and data).

Arguments:

A. target—the file which is to be linked TO.

B. link—the URL of the link to be created.

The create-link operation has a number of restrictions in the preferred embodiment:

A. Both target and link must be part of the same multifile system.

B. Target may not be a directory.

Algorithm:

A. (FR1 only) Start a transaction.

B. Lock the multifile system preferably using a shared lock on the root of the control tree 2 and an exclusive lock on the control directory 24 where the control file 21 is to be created.

C. Obtain the Control Information for target (t_permission, t_category, t_root, t_control, and t_expansion), and for link (l_permission, l_category, l_root, l_control, and l_expansion).

D. Abort if any of the following are true:
  1. User does not have "probe" permission for target.
  2. User does not have "create" permission for link.
  3. link already exists.
  4. target does not exist
  5. target is a directory
  6. t_root and l_root are different.

E. Record auxiliary information:
  1. target
  2. link
  3. t_control
  4. l_control
  5. l_expansion F. Perform the operation:
  1. Use a fileop to create a link l_control referring to t_control.
  2. Loop through the elements of l_expansion and t_expansion, using fileops to create a links for each element of l_expansion referring to the corresponding element of t_expansion.

G. (FR1 only) If all steps of the operation succeeded, commit the transaction; otherwise roll it back.

H. (FR2 only) If all steps in the operation succeeded, erase the auxiliary information.

I. Release the lock.

(FR2 only) Recovery:

A. Delete l_control.

B. Delete all links in l_expansion.

C. Read the recorded auxiliary information and restart the operation at step F (above).

(11) Unlink a Multifile

This routine "unlinks" a multifile specified by a URL. If the underlying file system allows multiple "links" to a file (e.g., UNIX), this may not result in the file being actually deleted (the file will exist as long as at least one link exists).

Arguments:

A. target—the URL of the link to be deleted.

Algorithm:

A. (FR1 only) Start a transaction.

B. Lock the multifile system preferably using a shared lock on the root of the control tree 2 and an exclusive lock on the control directory 24 where the control file 21 is located.

C. Obtain the Control Information for target.

D. Abort the operation if any of the following are true:
  1. User does not have delete permission.
  2. The file specified by target does not exist.

E. (FR2 only) Record auxiliary information:
  1. target
  2. control
  3. expansion F. Perform the operation:
  1. Use a fileop to delete each of the files specified by expansion.
  2. Use a fileop to delete control.

G. (FR1 only) If all steps of the operation succeeded, commit the transaction; otherwise roll it back.

H. (FR2 only) If all steps in the operation succeeded, erase the auxiliary information.

I. Release the lock.

(FR2 only) Recovery:

A. Read the recorded auxiliary information and restart the operation at step F (above).

(12) Change File/Directory Attributes

This is actually a family of routines for changing multifile/multidirectory attributes, e.g., owner or protection modes. Each attribute requires a different method for actually performing the attribute change. In some cases, a single routine will change multiple attributes. For example, UNIX contains a routine which changes both the 'owner' and 'group' attributes of a file.

Arguments:

A. target—the URL for the multifile/multidirectory 21, 24a to be operated on.

B. attribute—an identifier for the attribute(s) to be changed.

C. value—the new value(s) for the attribute(s).

Algorithm:

A. (FR1 only) Start a transaction.

B. Lock the multifile system preferably using a shared lock on the root of the control tree 2 and an exclusive lock on the control directory 24 where the control file 21/control directory 24a is located.

C. Obtain the Control Information for target.

D. Abort if:
  1. The file/directory specified by target does not exist.
  2. User does not have permission to change attribute. This depends on the attribute being changed. For example:
    a. Protection mode: the user must either be privileged or own the file.

b. Owner ID: the user must be privileged.
c. Group ID: the user must be privileged or own the file AND be a member of the indicated group.

E. (FR2 only) Record auxiliary information:
1. target
2. attribute
3. value
4. control
5. expansion F. Use fileops to change the indicated attribute for control and for every element of expansion to value.

G. (FR1 only) If all steps of the operation succeeded, commit the transaction; otherwise roll it back.

H. (FR2 only) If all steps in the operation succeeded, erase the auxiliary information.

I. Release the lock.

(FR2 only) Recovery:

A. Read the recorded auxiliary information and restart the operation at step F (above).

(13) Get Status Information

This routine allows status information to be obtained for a multifile/multidirectory. Such information includes the values for various attributes (e.g., owner, access permissions), plus other information relating to the file itself, such as its length in bytes.

With regard to multifiles/multidirectories, there are three classes of status information in the preferred embodiment:

A. Attributes which will be inherited from the control file/directory, e.g., "inode number".

B. Attributes which will be inherited from the data files/directories, and which must be uniform across all the data files/directories. Examples include the "block size".

C. Attributes which are aggregated across the control and data files/directories by finding a maximum value, e.g., "most recent access time".

D. Attributes which are aggregated across the data files/directories by finding a sum, e.g., size in bytes.

Arguments:

A. target—the name of the multifile/multidirectory for which status information is desired.

Algorithm:

Note: because nothing is changed in the system, there is no need to start/commit transactions or record/erase/recover auxiliary information.

A. Lock the multifile system using a shared lock on the root of the control tree 2 and a shared lock on the directory where the control file 21/control directory 24a is located.

B. Obtain the Control Information for target.

C. Use fileops to obtain status information for every URL in expansion and control.

D. Create a status object by aggregating the status objects obtained just above. For UNIX, this is done as follows:

1. Device Id. This is the identifier for the physical storage device used to store a file/directory. Inherited from the control file/directory.

2. Inode Number. This is an internal identifier for a file/directory, unique within a UNIX file system. Inherited from the control file/directory.

3. File Mode. This contains access control information, and also tells whether something is a file, a directory, or something else. These should be uniform across all control and data files/directories.

4. Number of Links. This is the number of hard links to a file/directory. Inherited from the control file/directory.

5. UID, GID. These are numerical identifiers from the 'user ID' and 'group ID' of a file/directory, and are used for access control purposes. Inherited from the control file/directory.

6. rdev. A code for the type of the storage device. Inherited from the control file/directory.

7. size in bytes. An integer giving the total number of bytes for the object. For directories, inherit this from the control directory. For files, this is the sum of the sizes of all data files.

8. blocksize. An integer giving the 'block size' used by the file system. This should be uniform across all data files, and is inherited from the data files.

9. number of blocks. An integer giving the total number of blocks used for the file. For directories, inherited from the control directory. For data files, this is the sum of the number of blocks across all data files.

10. access time, modification time, change time. These are time stamps showing when certain actions have been taken with regard to a file/directory. These are computed as the maximum across all files/directories.

E. The individual status objects for the control and data files/directories are returned as an array.

F. Release the lock.

(14) Rename a Multifile/Directory

This changes the name of a multifile/multidirectory. Both the old and new names must be part of the same multifile system.

Arguments:

A. old_path—a URL giving the current name of the multifile/multidirectory.

B. new_path—a URL giving the new name for the multifile/multidirectory.

Algorithm:

A. (FR1 only) Start a transaction.

B. Lock the multifile system, preferably an exclusive lock at the root of the multiple system.

C. Obtain the Control Information for old_path (old_permission, old_category, old_root, old_control, and old_expansion), and for new_path (new_permission, new_category, new_root, new_control, and new_expansion).

D. Abort the operation if any of the following are true:
1. new_root and old_root are different.
2. old_category is "none"
3. old_category is "file" and new_category is "directory"
4. old_category is "directory" and new_category is "file"
5. new_category is "directory," and new_control contains anything other than ".mdir"

E. (FR2 only) Record auxiliary information:
1. new_control
2. old_control
3. new_expansion
4. old expansion
5. old_category
6. new_category F. Perform the operation:
  1. If new_category is "directory", use fileops to delete new_control/.mdir (omit this step if in recovery processing and old_control does not exist).
  2. Use fileops to rename old_control to new_control.
  3. Use fileops to rename each element of old_expansion to new_expansion.
G. (FR1 only) If all steps of the operation succeeded, commit the transaction; otherwise roll it back.
H. (FR2 only) If all steps in the operation succeeded, erase the auxiliary information.
I. Release the lock.
(FR2 only) Recovery:
A. Read the recorded auxiliary information and restart at step F (above).

(15) Additional File Operations

The above routines describe the implementation of the most important file system operations. Additional file operations may be implemented in similar fashion.

(16) Adding Compatibility with Native File System Operations

Except for the operations to create and remove file systems, all of the above operations may be easily extended to handle non-multifiles as if they were multifiles having a single data ply (and no control ply). The following approach is generally applicable:
  A. Inspect the URL of the target, and default certain fields:
    1. If the type is absent (e.g., "//node2/foo"), default it to "file:".
    2. If the host is absent (e.g., "file:/foo"), default it to the local host name (e.g., "node2").
    3. If the URL is actually a "relative pathname" (e.g., "foo"), then create a URL by adding type of "file", a host of "localhost", and convert the relative_pathname to an absolute pathname by adding the "current working directory." (For example, if the current host is "node2" and the current working directory is "/homedir", then "foo" will become "file://node2/homedir/foo".
  B. If the defaulted URL has a type of "mfile", then call the appropriate multifile operation, as defined above (e.g., create multidirectory, create multifile, etc.).
  C. If the defaulted URL has a type of "file", then use a fileop to perform the appropriate operation using the native file system (e.g., rename, unlink, etc.). The one exception to this is the "expand" operation, which has no counterpart in the native file system. This operation is handled as follows in the preferred embodiment:
    1. Determine whether the user has "probe" access to the defaulted URL.
    2. If so, then return an array of length 1, having the defaulted URL as its sole member.

Deployment of the Invention

Figure 5:
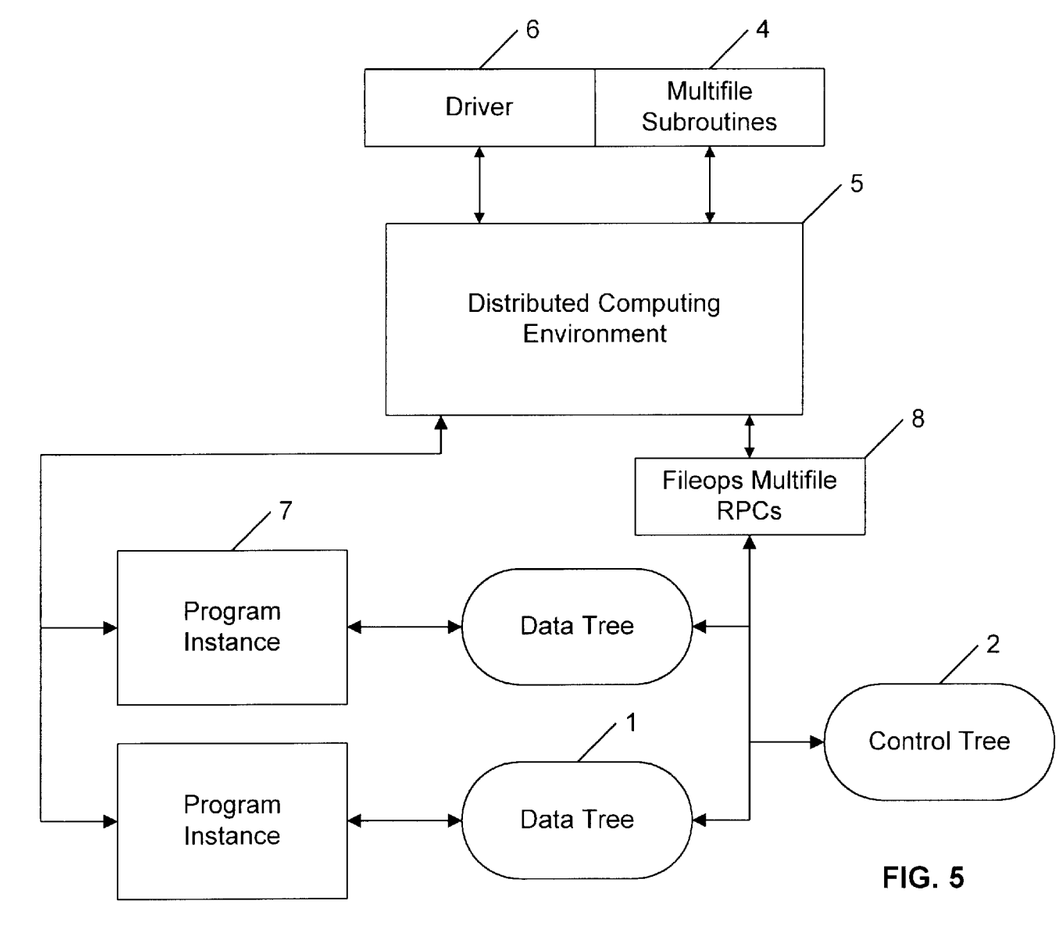
FIG. 5 is a block diagram showing the relationship of components comprising a first alternative embodiment of the invention.

This invention may be applied in several ways:
  As part of an application. FIG. 5 is a block diagram showing the relationship of components where the invention is implemented as part of an application. Multifile subroutines 4 are included as part of an application driver 6. The application driver 6 and the multifile subroutines 4 share access to a single distributed computing environment 5, which invokes distributed program instances 7 on the behalf of the driver 6, and fileops and RPCs 8 on behalf of the multifile software.

Figure 6:
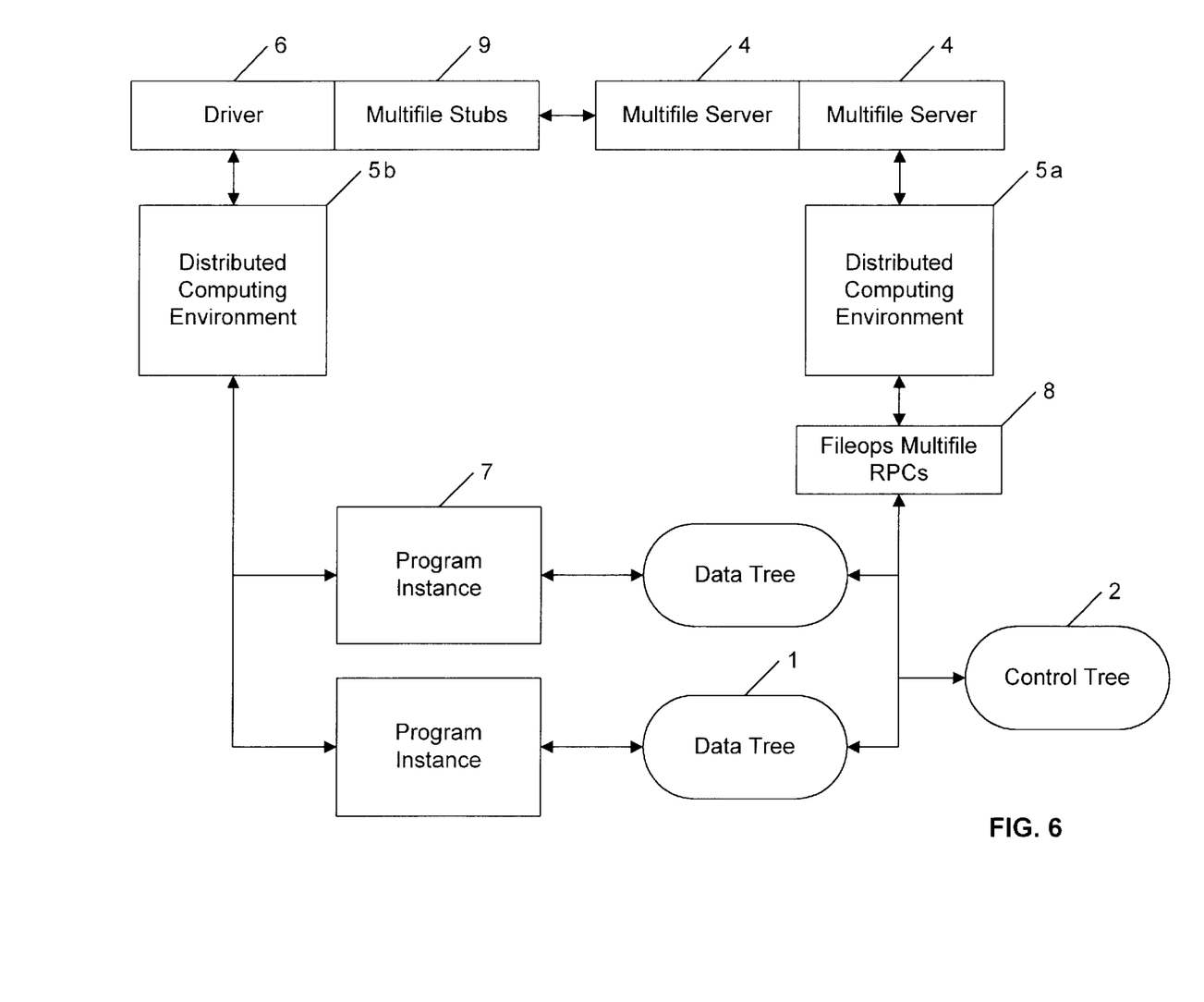
FIG. 6 is a block diagram showing the relationship of components comprising a second alternative embodiment of the invention.
Figure 7:
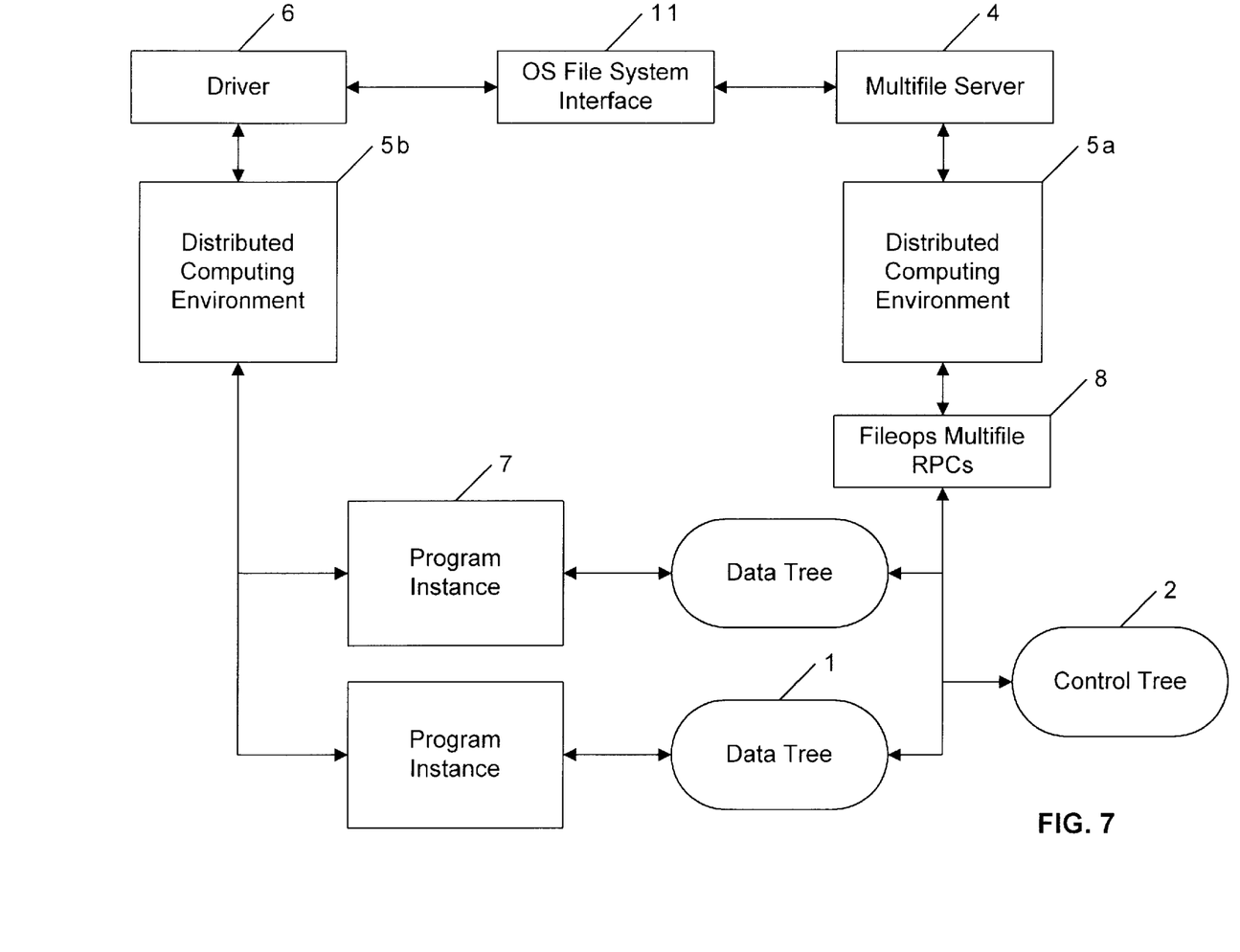
FIG. 7 is a block diagram showing the relationship of components comprising a third alternative embodiment of the invention.

As a distributed service. FIG. 6 is a block diagram showing the relationship of components where the invention is implemented as a distributed service. The "owner" of the computers containing the control and data trees 1, 2 would need to ensure that at least one "multifile server" 4 was running at all times. The subroutines explained below would then be embedded as part of the servers 4, which would also incorporate a distributed computing environment 5. Applications wishing to use these services would contain "stub subroutines" 9 which would contact the appropriate servers 4 to perform multifile operations via a distributed computing environment 5a. The distributed computing environment 5a invokes fileops and RPCs 8 on behalf of the multifile software. Preferably, these stub subroutines 9 would mimic the interface of the native file system interface, in order to minimize the work needed to adopt the multifile system. Communications between a conventional application driver and the program instances 7 might then be governed by a second distributed computing environment 5b. Alternatively, communications between the driver and the program instances might be governed by the same distributed computing environment as is used by the multifile server.

As a part of an operating system. FIG. 6 is a block diagram showing the relationship of components where the invention is implemented as part of an operating system. Typically, the operating system's file system interface might be extended to recognize multifile commands and dispatch them to a multifile server 4 via a "file system driver" interface 11. Many operating systems (e.g., Microsoft Corporation's Windows NT operating system) provide interfaces which facilitate this sort of integration. Once the multifile server 4 has been engaged, the implementation is much like the case of a distributed service.

Program Implementation

The invention may be implemented in hardware or software, or a combination of both. However, preferably, the invention is implemented in computer programs executing on programmable computers each comprising at least one processor, a data storage system (including volatile and non-volatile memory and/or storage elements), at least one input device, and at least one output device. Program code is applied to input data to perform the functions described herein and generate output information. The output information is applied to one or more output devices, in known fashion.

Each program is preferably implemented in a high level procedural or object oriented programming language to communicate with a computer system. However, the program, can be implemented in assembly or machine language, if desired. In any case, the language may be a compiled or interpreted language.

Each such computer program is preferably stored on a storage medium or device (e.g., ROM or magnetic diskette) readable by a general or special purpose programmable computer, for configuring and operating the computer when the storage media or device is read by the computer to perform the procedures described herein. The inventive system may also be considered to be implemented as a computer-readable storage medium, configured with a computer program, where the storage medium so configured causes a computer to operate in a specific and predefined manner to perform the functions described herein.

A number of embodiments of the invention have been described. Nevertheless, it will be understood that various modifications may be made without departing from the spirit and scope of the invention. Accordingly, it is to be understood that the invention is not to be limited by the specific illustrated embodiment, but only by the scope of the appended claims.

What is claimed is:

1. A method for creating and using a parallel virtual file system for a parallel processing system, comprising the steps of:
    (a) partitioning a data file to be processed in the parallel processing system;
    (b) storing the partitions on storage devices of the parallel processing system as a set of isomorphic data trees comprising data files and directories;
    (c) providing a control tree on a storage device of the parallel processing system for storing a model of the file structure of the data trees, the combination of the control tree and the set of data trees defining a multifile system, with sets of isomorphic data files within the multifile system defining multifiles and sets of isomorphic directories within the multifile system defining multi-directories;
    (d) providing a set of multifile subroutines for accessing and modifying the multifile system, wherein the multifile subroutines:
        (1) effect file operations on processing components of the parallel processing system using remote procedure calls; and
        (2) prevent interference of concurrent file operations by creating a transactional lock for multifiles and multi-directories involved in each file operation;
        (3) preserve the isomorphism of the data trees by maintaining the model of the file structure of the data trees within the control tree before and after each file operation.

2. The method of claim 1, further including the step of applying a distributed transaction processing protocol to each file operation performed by the multifile subroutines to ensure atomicity of structural changes to the multifile system.

3. The method of claim 2, wherein the distributed transaction processing protocol includes a two-phase commit protocol to assure that all changes made by the file operations can be made permanent or can be rolled back.

4. The method of claim 2, wherein the distributed transaction processing protocol includes the step of recording auxiliary information before each file operation such that, if a failure occurs during a file operation, partial changes effected by the failed file operation may be undone or the file operation may be forced to completion.

5. The method of claim 1, wherein each data file and directory of every multifile and multidirectory is identified by a Universal Resource Locator designator.

6. A method for creating and using a parallel virtual file system for a parallel processing system, comprising the steps of:
    (a) partitioning a data file to be processed in the parallel processing system;
    (b) storing the partitions on storage devices of the parallel processing system, the storage devices having a native file system, as a set of isomorphic data trees comprising native data files and native directories;
    (c) providing a control tree, as a native file on a storage device of the parallel processing system, for storing a model of the native file structure of the data trees, the combination of the control tree and the set of data trees defining a multifile system, with sets of isomorphic data files within the multifile system defining multifiles and sets of isomorphic directories within the multifile system defining multi-directories;
    (d) providing a set of multifile subroutines for accessing and modifying the multifile system, wherein the multifile subroutines:
        (1) effect native file operations on processing components of the parallel processing system using remote procedure calls; and
        (2) prevent interference of concurrent native file operations by creating a transactional lock for multifiles and multi-directories involved in each native file operation;
        (3) preserve the isomorphism of the data trees by maintaining the model of the native file structure of the data trees within the control tree.

7. The method of claim 6, further including the step of applying a distributed transaction processing protocol to each native file operation performed by the multifile subroutines to ensure atomicity of structural changes to the multifile system.

8. The method of claim 7, wherein the distributed transaction processing protocol includes a two-phase commit protocol to assure that all changes made by the native file operations can be made permanent or can be rolled back.

9. The method of claim 7, wherein the distributed transaction processing protocol includes the step of recording auxiliary information before each native file operation such that, if a failure occurs during a native file operation, partial changes effected by the failed native file operation may be undone or the native file operation may be forced to completion.

10. The method of claim 6, wherein each data file and directory of every multifile and multidirectory is identified by a Universal Resource Locator designator.

11. A computer program, residing on a computer-readable medium, for creating and using a parallel virtual file system for a parallel processing system, comprising instructions for causing a computer to:
    (a) partition a data file to be processed in the parallel processing system;
    (b) store the partitions on storage devices of the parallel processing system as a set of isomorphic data trees comprising data files and directories;
    (c) provide a control tree on a storage device of the parallel processing system for storing a model of the file structure of the data trees, the combination of the control tree and the set of data trees defining a multifile system, with sets of isomorphic data files within the multifile system defining multifiles and sets of isomorphic directories within the multifile system defining multi-directories;
    (d) provide a set of multifile subroutines for accessing and modifying the multifile system, wherein the multifile subroutines:
        (1) effect file operations on processing components of the parallel processing system using remote procedure calls; and
        (2) prevent interference of concurrent file operations by creating a transactional lock for multifiles and multi-directories involved in each file operation;
        (3) preserve the isomorphism of the data trees by maintaining the model of the file structure of the data trees within the control tree before and after each file operation.

12. The program of claim 11, further comprising instructions for causing a computer to apply a distributed transaction processing protocol to each file operation performed by the multifile subroutines to ensure atomicity of structural changes to the multifile system.

13. The program of claim 12, wherein the distributed transaction processing protocol includes a two-phase commit protocol to assure that all changes made by the file operations can be made permanent or can be rolled back.

14. The program of claim 12, wherein the distributed transaction processing protocol further comprising instructions for causing a computer to record auxiliary information before each file operation such that, if a failure occurs during a file operation, partial changes effected by the failed file operation may be undone or the file operation may be forced to completion.

15. The program of claim 11, wherein each data file and directory of every multifile and multidirectory is identified by a Universal Resource Locator designator.

16. A program stored on a computer readable medium for creating and using a parallel virtual file system for a parallel processing system, wherein the processing system executes the following steps:
   (a) partitioning a data file to be processed in the parallel processing system;
   (b) storing the partitions on storage devices of the parallel processing system, the storage devices having a native file system, as a set of isomorphic data trees comprising native data files and native directories;
   (c) providing a control tree, as a native file on a storage device of the parallel processing system, for storing a model of the native file structure of the data trees, the combination of the control tree and the set of data trees defining a multifile system, with sets of isomorphic data files within the multifile system defining multifiles and sets of isomorphic directories within the multifile system defining multi-directories;
   (d) providing a set of multifile subroutines for accessing and modifying the multifile system, wherein the multifile subroutines:
      (1) effect native file operations on processing components of the parallel processing system using remote procedure calls; and
      (2) prevent interference of concurrent native file operations by creating a transactional lock for multifiles and multi-directories involved in each native file operation;
      (3) preserve the isomorphism of the data trees by maintaining the model of the native file structure of the data trees within the control tree.

17. The program of claim 16, further including the step of applying a distributed transaction processing protocol to each native file operation performed by the multifile subroutines to ensure atomicity of structural changes to the multiple system.

18. The program of claim 17, wherein the distributed transaction processing protocol includes a two-phase commit protocol to assure that all changes made by the native file operations can be made permanent or can be rolled back.

19. The program of claim 17, wherein the distributed transaction processing protocol further comprising instructions for causing a computer to record auxiliary information before each native file operation such that, if a failure occurs during a native file operation, partial changes effected by the failed native file operation may be undone or the native file operation may be forced to completion.

20. The program of claim 16, wherein each data file and directory of every multifile and multidirectory is identified by a Universal Resource Locator designator.

* * * * *